United States Patent
Chizen

[11] Patent Number: 5,335,795
[45] Date of Patent: Aug. 9, 1994

[54] STORAGE RACK FOR CASSETTES AND COMPACT DISCS

[76] Inventor: Dwight Chizen, 403 Sackville St., Toronto, Ontario, Canada, M4X 1S6

[21] Appl. No.: 931,854

[22] Filed: Aug. 18, 1992

[30] Foreign Application Priority Data

Aug. 28, 1991 [CA] Canada .................. 2050174

[51] Int. Cl.⁵ ............................................. A47G 19/08
[52] U.S. Cl. ................................. 211/41; 312/9.53; 312/9.55
[58] Field of Search .................. 211/40, 41; 206/387; 312/9.9, 9.47, 9.48, 9.53, 9.55

[56] References Cited

U.S. PATENT DOCUMENTS

| | | | |
|---|---|---|---|
| 464,544 | 12/1891 | Wood | 211/40 |
| 3,446,360 | 5/1969 | Gutierrez | 211/40 |
| 3,812,975 | 5/1974 | Gutierrez | 211/40 |
| 3,897,871 | 8/1975 | Zinnbauer | 211/41 |
| 4,712,679 | 12/1987 | Lowe | 206/387 |
| 4,960,205 | 10/1990 | Wang | 206/387 |

*Primary Examiner*—P. Austin Bradley
*Assistant Examiner*—Chuck Y. Mah
*Attorney, Agent, or Firm*—Zarley, McKee, Thomte, Voorhees & Sease

[57] ABSTRACT

A storage and display rack for rectangular cases with flat sides and a thickness less than their height or width, such as audio or video tape cassettes or compact disc storage boxes. The storage rack is a rigid perimeter frame consisting of two side rails, with a series of holes in a specific pattern, into which are inserted pins. The rails are connected by means which keep them in spaced parallel relationships such as a front and rear strut. The distance between the side rails is slightly greater than the width of the case to be stored while the distance between the front and rear struts is only limited by the number of cases to be stored or the cabinet in which it is to be housed. When inserted into the storage device, the cases are held at near their bottom between pairs of pins which allow the cases to stand in a substantially upright fashion either leaning forward or backward, permitting the user to read the title imprinted on the face of a case as the ones in front are rotated forward. The horizontal spacing of the holes on the side rails determines the back and forward angle of inclination and repositioning of the pins permits container of different thickness to be stored and displayed in the same rack. By permitting the cases of different thickness to be stored in the same rack and by permitting the user to reposition the pins to suit different sizes of cases, the rack allows for greater storage flexibility than existing products. The rack may be placed on any surface such as a counter top, table top, or shelf in a cabinet.

7 Claims, 5 Drawing Sheets

STORAGE RACK FOR CASSETTES AND COMPACT DISCS

FIELD OF INVENTION

This invention relates to a storage and display rack for rectangular containers or cases such as tape cassettes, compact disc boxes, or other similar thin, rigid, rectangular articles.

BACKGROUND OF THE INVENTION

Compact disc recordings are the successor to popular music and video recording storage throughout the world. Due to the durability, concentration of information, thinness of the disc and container, the disc format is likely to become a most popular media.

The envelope of the compact discs has been highly standardized in its packaging and presentation. The rigid cases for the compact discs, often called "jewel boxes", have a uniform width and height, and the thickness of the cases are limited generally to two sizes; a case for one disc, called a single, and a case for two to four discs, called a double. The titles of the discs are printed on the edge of the case at the hinge side, and the front of the case is generally reserved for the traditional "album cover graphics" while the rear displays the recording index. There is a cultural appeal to the miniaturization of the phonograph record album cover which is the cover of the disc container, many of which are re-recordings of earlier phonograph albums. The ease of recognition of the disc title by visualizing the cover graphics is preferred by many users and is generally easier for most person's eyesight than inspecting the small print on the hinge side edge of the disc case.

Products heretofore available only store cases of one thickness, and only a few allow easy inspection of the title while stored in a storage container. There is need of a storage device which satisfies the user's varied needs; to store discs in any combination of single and double cases; to be able to rearrange the order of the single and double cases without causing the obsolescence of the storage device; to easily see the face of the case and its unique graphics; to be able to flip through a row of cases quickly without creating chaos. The present invention has been designed to meet such needs.

SUMMARY OF THE INVENTION

It is the object of the invention to provide a case holder which conveniently holds a number of rigid cases of various thicknesses for display, while allowing ease of insertion and removal from the case holder without the case falling from its holder during rapid use.

It is a further object of the invention that cases of different thicknesses can be placed in any order within the holder, and that the order may be changed at will without rendering the holder, or part of the holder, obsolete.

The invention is composed of a rectangular frame containing mirror imaged patterns of holes on the opposing sides of the holder. The holes are organized in rows, the number of rows being determined by the geometry of the angle of the front and rear case position. Where the angle of slope from the vertical axis are the same for the front and rear case positions, there are only three rows required. Where the angles of slope of the front and rear case positions are not equal, more than three rows are required.

This invention also involves removable pins which permit the user to adjust the pin geometry so that double cases may be inserted among the single cases. The pins fit into the holes. The pins act as guides and stops which limit the travel or movement of the case in the holder. Viewed from the end of the case, the pins surround the base of the case at its outer ends in a triangular pattern where the centre and lowermost pin always supports the vertical load of the case, and the other two pins are positioned higher to support the front and the rear of the case. The relationship of the placing of the pins is that the two upper pins are horizontally spaced apart wider than the thickness of the case; this allows the case to fall to the front or rear of the holder, stopping its fall as the case wedges itself between the two aforementioned pins. The greater the horizontal distance becomes between the pins, the greater the angle of slope of the case becomes between its forward and rearward positions. The third pin is positioned lower than the other two, and equidistant between them, so that the pin is always in contact with the flat portion of the bottom of the case, close to the edge of the front or rear face. The third pin is always sufficiently lower than the upper two pins so that when the case falls to the front, the rear of the case is prevented from rising by the rear pin, and similarly when the case falls to the rear, the front pin prevents the front of the case from rising past the front pin and falling out of its storage location in the holder.

As the case holder is designed to contain a plurality of cases, the top pins are positioned horizontally equidistant down the side of the holder. Similarly, the lower pins are positioned at the same horizontal spacing as the upper pins.

In the case of the single and double compact disc case, the double case is thicker than the combined thickness of the two single cases by an amount approximately equal to the outer diameter of the aforementioned pins which position the case in the holder.

The invention has another, lower row of holes for pins on the sides of the holder to facilitate the positioning of the lower support pin of the double disc case. Upon deciding where a double case is to be inserted in the holder, the upper pin blocking the entry of the double case and the two adjacent lower pins are removed from both sides of the holder. A pin is inserted in the bottom row of holes, centred on the two removed pins from the row above. This rearrangement of pins lowers the double case into the holder so that the geometry of the pin position for the double case is similar to those for the single case.

Therefore, in accordance with this invention, a rack is provided for thin, flat, rectangular cases and the like which comprises a pair of parallel spaced side rails having inside surfaces facing each other, means to hold the rails in space parallel relationship and means on the rails to support said cases and permit limited rotation between a rearward tilted position and a forward tilted position; the said support means comprising a pattern of holes on the inside surface of said rails adapted to receive pins therein with a portion protruding from the inside rail surface. The said pattern of holes comprises a top row of holes, horizontally spaced to permit a case to be inserted in substantially upright position between a pair of pins mounted in said top holes such that said pins engage the front face and rear face of Said case respectively to permit limited movement of said case between a rearward tilted position and a forward tilted position, and means to support said case by engaging the bottom side thereof. The means to support said case may comprise pins mounted in a lower row of holes each hole horizontally spaced between a pair of said top row holes. The pattern of holes may also be arranged so that a single compact disc case may be inserted between pins in two adjacent holes of the top row and a double compact disc may be inserted between pins spaced two holes apart and further comprising a third row of holes beneath said second row, each hole of said third row being horizontally spaced between the holes of said second row.

In one embodiment of the invention, the means to support the bottom of the cases may comprise a bottom panel spanning between the bottoms of the respective side rails.

In another embodiment of the invention, the top row of holes may comprise a series of alternative holes at different levels such that the pins may be located so that the rearward tilt of a case will be different than the forward tilt thereof.

Further features of the invention will be described, or will become apparent, in the following detailed description of the preferred embodiment.

BRIEF DESCRIPTION OF THE DRAWINGS

The invention will be better understood by a detailed description of one embodiment with reference to the following drawings.

DETAILED DESCRIPTION OF THE PREFERRED EMBODIMENT

Figure 1:
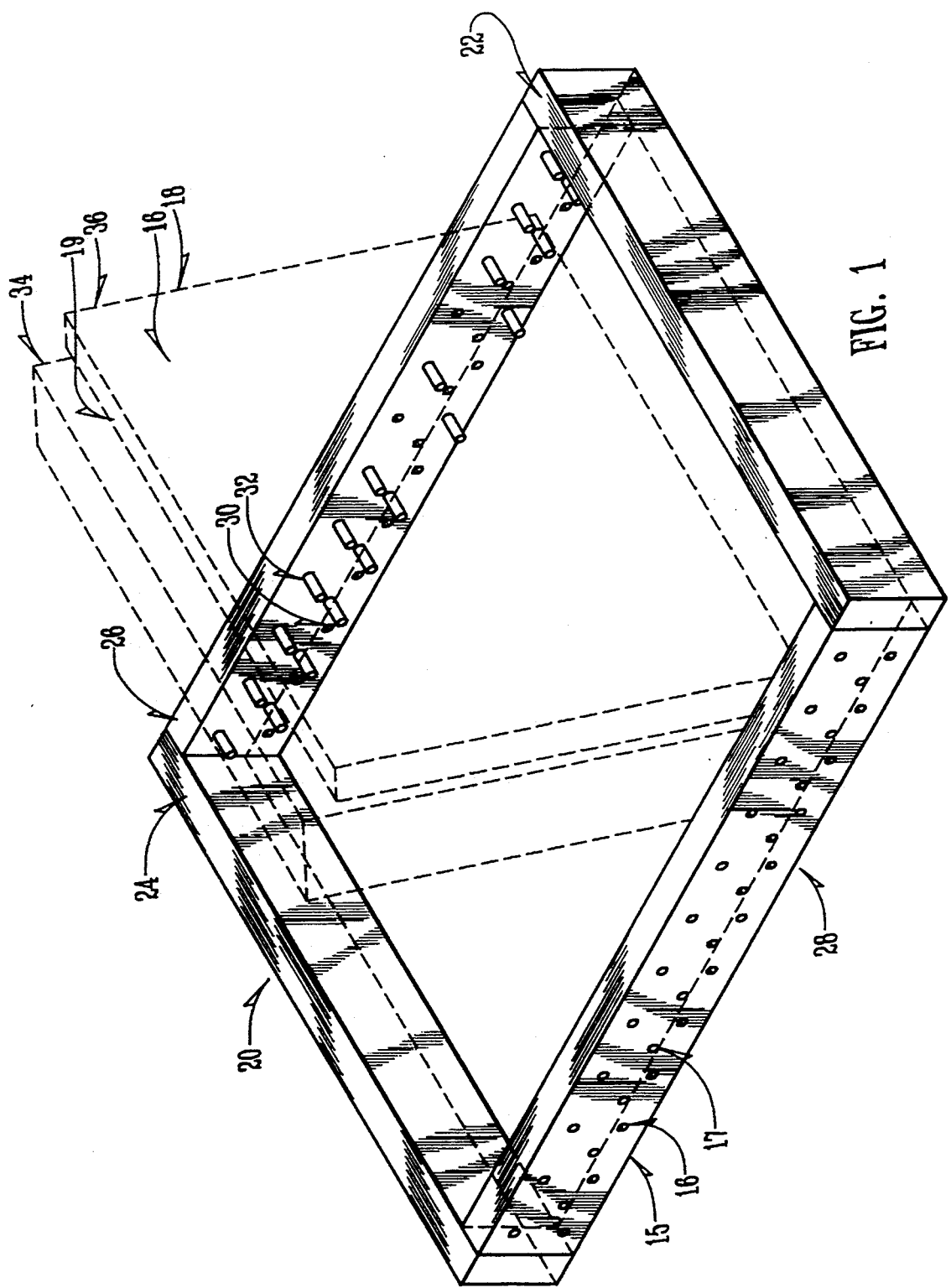
FIG. 1 is a general perspective view of one embodiment of this invention sitting on a flat surface.

FIG. 1 illustrates a perspective view of a preferred embodiment of the present invention in which the rack 20 is designed to sit on a flat, horizontal surface and is composed of front and rear struts 22 and 24 respectively connecting between the corresponding front and rear ends of the side rails 26 and 28 respectively. The side rails contain, on their inward facing surface, a plurality of holes 30 adapted to receive pins 32 at selected hole locations determined by the size of the cases 34 and 36 to be stored in the rack.

It should be kept in mind that the rack herein described is designed to house cases which are generally thin and flat, having a large flat front face, such as 16 and a corresponding rear face on the back, as well as relatively narrow bottom, side and top edges 17, 18 and 19 respectively.

The holes 30 in each inward face of the rails 26 and 28 are similarly positioned directly opposite each other in matching patterns. The holes are located in horizontal rows A, B and C and the holes are spaced at equal dimensions from each other in each row, and are offset from the holes in the adjacent row so that each hole in a row is equadistant from the nearest pair of holes in the adjacent row. The dimension of the equal and horizontal interval spacing of the holes in a given row is a function of the size of the case and the amount of travel required. The angle of travel 38, shown in FIG. 2, will be decreased by decreasing the interval spacing between the holes and will be increased by increasing the interval spacing between the holes. The invention is not limited to the holes being located in horizontal or straight rows, as will become apparent, since other characteristics are obtainable by ordering the location of the holes in a non orthogonal relationship. However, for simplicity of the description, the location of the holes will follow straight, horizontal rows in the illustrated embodiment.

Figure 2:
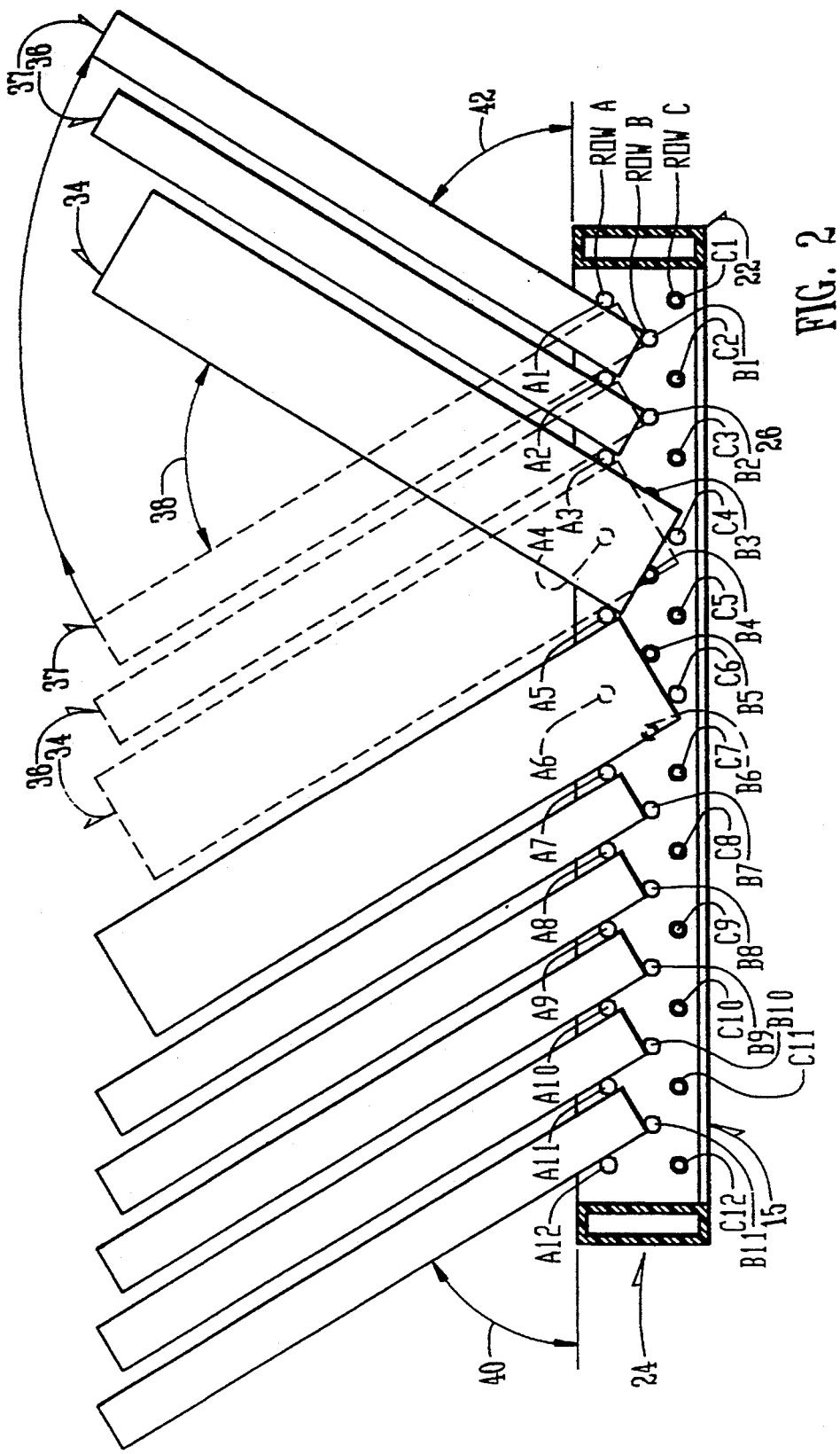
FIG. 2 is a cross section view of the embodiment in FIG. 1, looking at the interior elevation of one side of the rack with holes and pins holding single and double cases.

In FIG. 2, the cases 34 and 36 are rotated from the rearward tilting position shown in dotted lines to the forward tilted position illustrated in solid lines. In this illustrated embodiment, the angles 40 and 42 are equal and the angle 38 is bisected by a line which is perpendicular to the rails and therefore to the supporting surface of the rack. The rotation of the cases is limited by the pins in row A and prevented from colliding with adjacent cases by resting on a pin in row B for single cases or in row C for wider cases. For example, pins A2 and A3, which limit the rotation of case 36, are equadistant from pin B2 which supports the case on its bottom side and similarly pins A3 and A5, which limit the rotation of the thicker case 34, are equadistant from pin C4 which supports that case.

Row B is positioned sufficiently lower than row A so that when the case 36 is in the rearward position, the rotation of the case is limited from counterclockwise rotation by the bottom of the front face of the case being in contact with the pin A2 and is thereby prevented from contacting case 37. When the case is rotated to the forward position, the rotation of the case is limited from clockwise rotation by the bottom of the rear face of the case being in contact with pin A3 and thereby prevented from contacting case 34 or 37. Similarly, row C is positioned lower than row A so that when the thicker case is in the rearward position, the rotation of the case is limited from counterclockwise rotation by the bottom of the front face of the case being in contact with the pin A3. When the thicker case is rotated to the forward position, the rotation of the case is limited from clockwise rotation by the bottom rear face of the case being in contact with the pin A5 (while the front face is in contact with the pin A3) and the bottom edge is supported by the pin C4.

Figure 3:
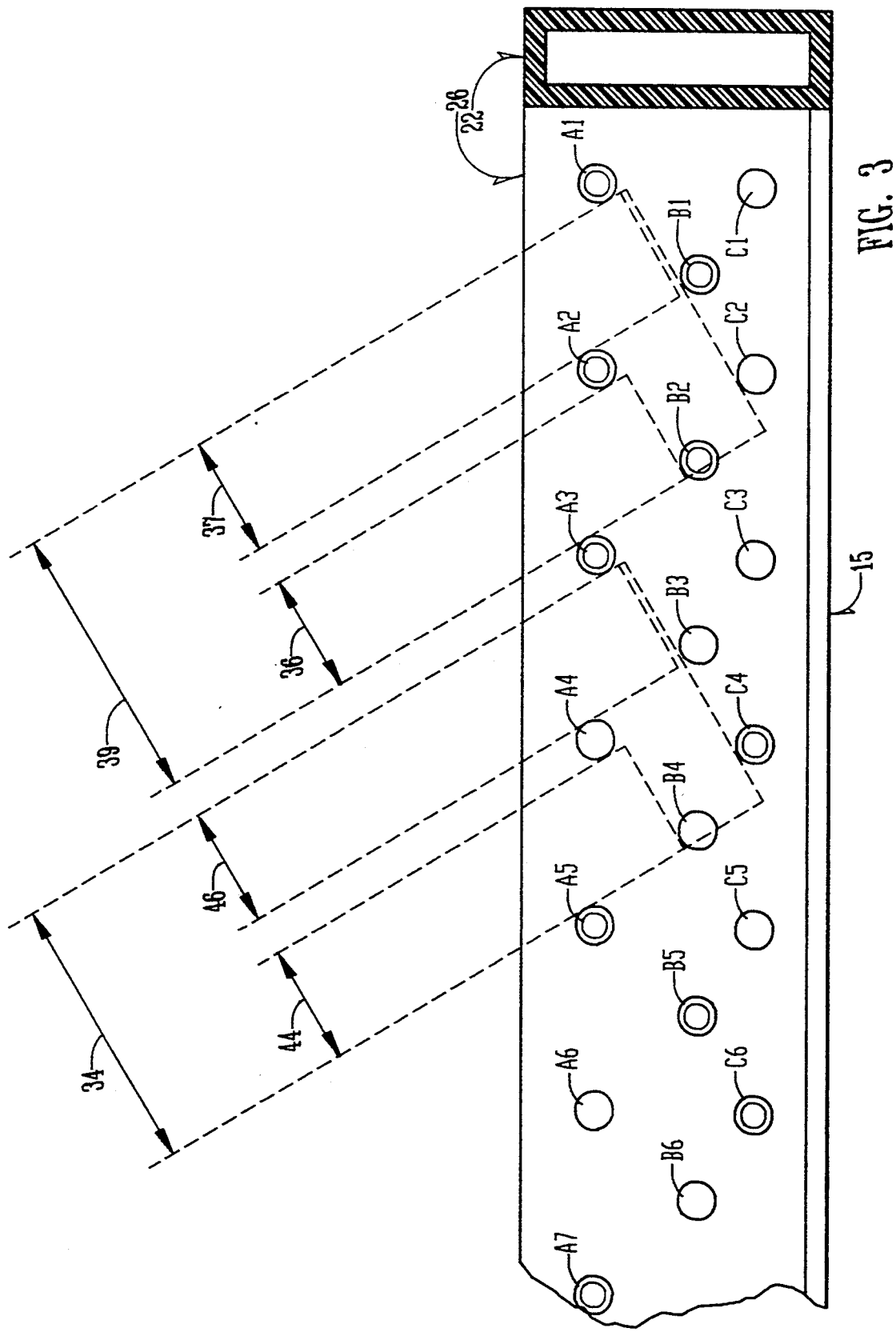
FIG. 3 is an enlarged view of the front portion of the side in FIG. 2.

FIG. 3 shows the geometric relationship of the pins to the position of both the single and double case and the method of installing a double case in a location where single ones had previously been held. Case 34 is held between pins A3 and A5 and supported by pin C4. 36 is held between pins A2 and A3 and supported by pin B2. Case 37 is held between pins A1 and A2 and supported by pin B1. To convert the location of cases 36 and 37 for a thicker case 39, the pins A2, B1 and B2 can be removed to allow the case 39 to rest on pins A3 and A1 and the pin C2 inserted to prevent the bottom of the case 39 from being positioned too low and interfering with the case 34 when rotated clockwise to the forward position. Similarly, to remove case 34 and insert two cases 44 and 46, the pin C4 can be removed and pins inserted in holes A4, B3 and B4.

Figure 4:
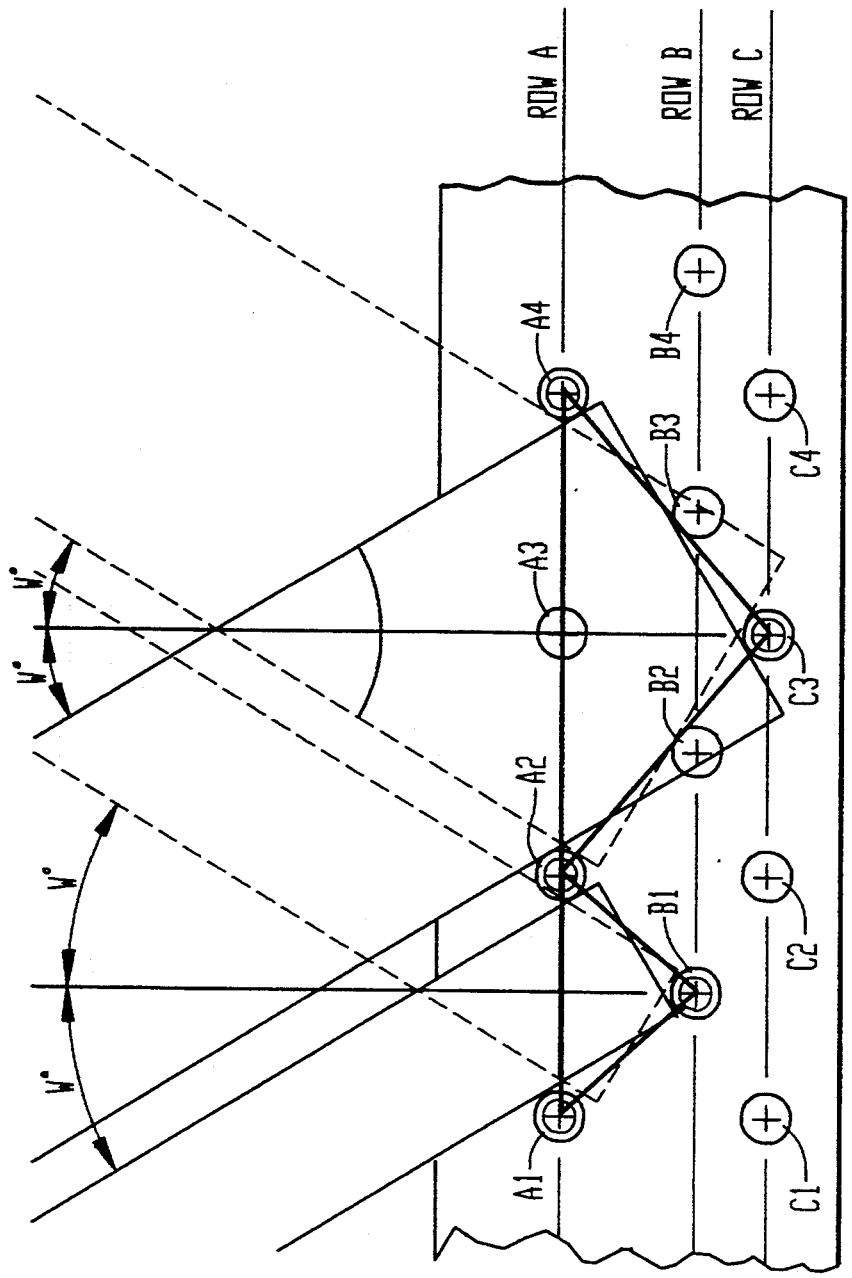
FIG. 4 is an enlarged view of one pin arrangement in a rack for containers to be tilted at the same angle to the front or the rear resting positions.

FIG. 4 shows the relationship between the pins for cases being held at the same forward and rearward angle as measured from a reference line perpendicular to the horizontal rail of the rack. Cases are held at equal forward and rear angle W degrees so that the total angle between the forward and rearward position is 2W degrees.

Figure 5:
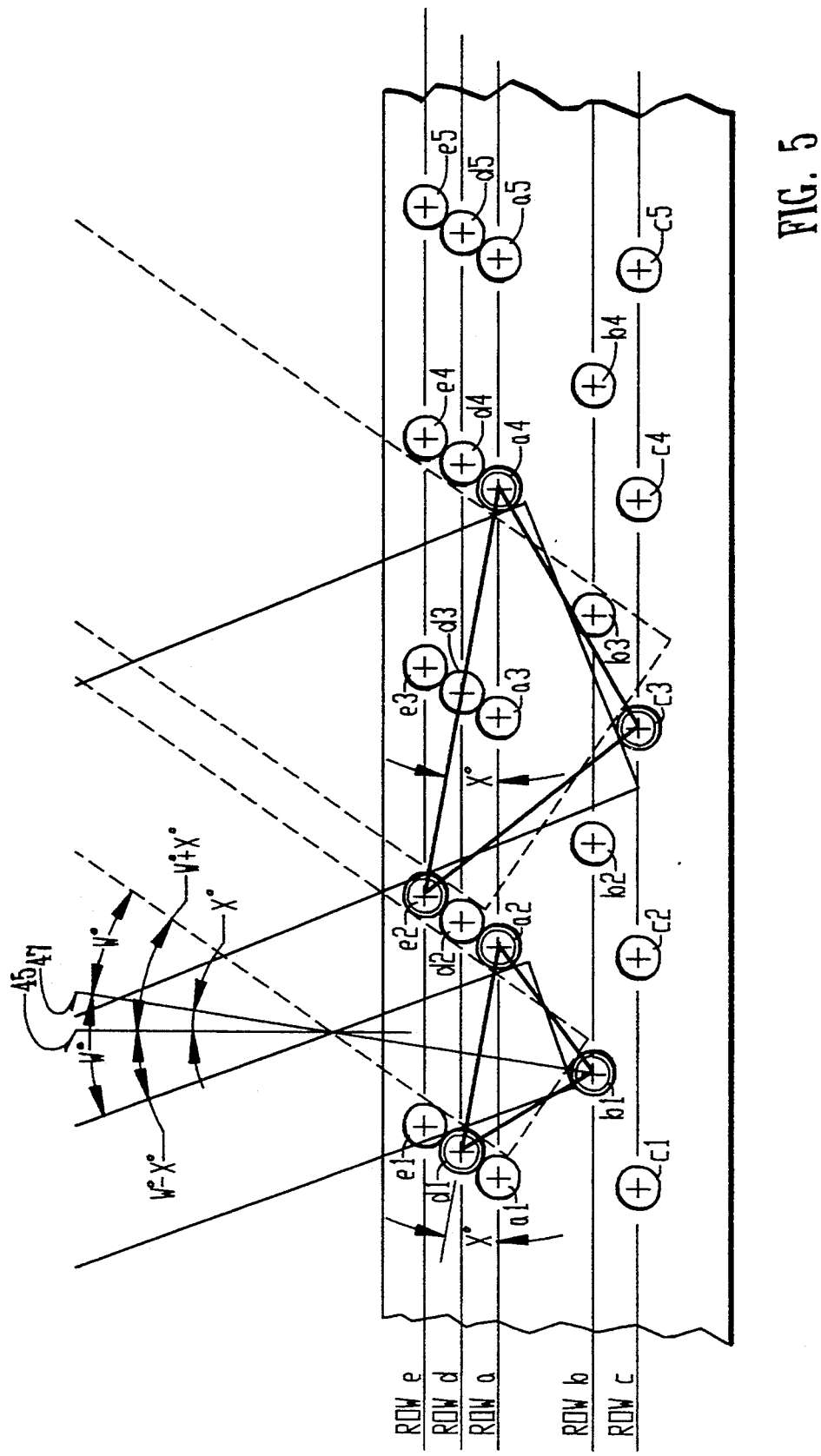
FIG. 5 is an enlargement of another pin arrangement in a rack for containers to be tilted at different angles to the front or rear resting positions.

FIG. 5 shows the cases being held at angles W which are bisected by a reference line 47 which is inclined in the forward direction by an angle X from the direction which is perpendicular to the rack or vertical. Thus, the cases rest at an angle W−X in the rearward position and at an incline of W+X in the forward position.

In FIG. 5, the triangle defined by the pins used to support a single thickness case d1-a2-b1 is the same triangle A1-A2-B1 shown in FIG. 4 but rotated clockwise by X degrees. Similarly, the triangle defined by the pins used to support the double thickness case e2-a4-c3 is the same triangle as A2-A4-C3 shown in FIG. 4 but rotated clockwise by X degrees.

In the embodiment shown in FIG. 4, the rotation of the triangle formed by the two pins in row A which determine the rearward and forward slope of the cases and the pin in row B or row C which prevents interference between adjacent cases when they are moved from the rearward to the forward position, can be rearranged as shown in FIG. 5 to offer a different inclination in the rearward and forward positions of the container. This can be achieved by replacing the holes in row A with a series of alternate holes designated as a, d and e in which the alternative holes a, d and e are offset so that, for single cases pins a2 and d1 are inclined from the horizontal by X degrees and for double cases, pins a4 and e2, for example, are similarly inclined X degrees from the horizontal.

Although the illustrated embodiment shows the side rails 26 and 28 held by the front and rear struts 22 and 24, this could be accomplished by a solid panel spanning between the bottoms of the side rails 26 and 28.

Such a bottom panel (not illustrated) could also be used as an alternative to the lower rows of pins B and C to support the bottom edge of the cases. If a full bottom panel is not desirable, an inward projecting flange 15, as illustrated in FIG. 1, running along the lower portions of the side rails 26 and 28 respectively, could also form a support for the bottom side of the cases as an alternative to the pins B and C.

Thus, by means of the present invention, a simple, inexpensive rack may be created in which the user can arrange to store single and double thickness cassette cases and the like and may search through the collection by tilting the cases from the rearward to the forward positions and back. The locations of single and double cases may be rearranged and, if desired, the angle of inclination rearward and forward may be varied.

It will of course be realized that modifications and variations of the illustrated embodiment might be employed without departing from the inventive concept herein.

The embodiments of the invention in which an exclusive property or privilege is claimed are defined as follows.

1. A rack for cases having flat front and rear faces and narrow bottom, side and top edges comprising:
a pair of parallel spaced side rails having inside surfaces facing each other;
means to hold said rails in spaced parallel relationship;
means on said rails to support said cases and permit limited rotation between a rearward tilted position and a forward tilted position;
said support means comprising a pattern of holes on the inside face of said rails, adapted to receive pins therein;
pins mountable in said holes, with a portion protruding from said inside rail surface, to engage front and rear faces of said cases;
said pattern of holes comprising a top row of holes horizontally spaced to permit a case to be inserted in substantially upright position between a pair of pins mounted in said top holes such that said pins engage the front face and rear face of said case respectively to permit limited movement of said case between a rearward tilted position and a forward tilted position;
means to support said case by engaging the bottom side thereof.

2. A rack as claimed in claim 1 in which the means to support said case comprises pins mounted in a lower row of holes, each hole horizontally spaced between a pair of said top row holes.

3. A rack as claimed in claim 2 in which a single compact disc case is insertable between pins in two adjacent holes of the top row and a double compact disc case is insertable between pins spaced two holes apart and further comprising a third row of holes beneath said second row, each hole of said third row being horizontally spaced between the holes of said second row.

4. A rack as claimed in claim 1 in which a single compact disc case is insertable between pins in two adjacent holes of the top row and a double compact disc case is insertable between pins spaced two holes apart and further comprising a third row of holes beneath said second row, each hole of said third row being horizontally spaced between the holes of said second row.

5. A rack as claimed in claim 1 in which the means to hold said rails in spaced parallel relationship comprises a bottom panel.

6. A rack as claimed in claim 1 in which the means to support said case includes a bottom panel to engage the bottom edge of said case.

7. A rack as claimed in claim 1 in which the means to support said case includes a horizontal flange extending along the bottom of each side rail and projecting inwardly therefrom to engage the bottom edge of said case.

* * * * *